(12) United States Patent
Newport et al.

(10) Patent No.: US 6,915,004 B2
(45) Date of Patent: Jul. 5, 2005

(54) CONTINUOUS TOMOGRAPHY BED MOTION DATA PROCESSING APPARATUS AND METHOD

(75) Inventors: Danny F. Newport, Knoxville, TN (US); Michael E. Casey, Knoxville, TN (US); Wing K. Luk, Knoxville, TN (US); Johnny H. Reed, Clinton, TN (US)

(73) Assignee: CTI PET Systems, Inc., Knoxville, TN (US)

( * ) Notice: Subject to any disclaimer, the term of this patent is extended or adjusted under 35 U.S.C. 154(b) by 681 days.

(21) Appl. No.: 10/086,906

(22) Filed: Feb. 28, 2002

(65) Prior Publication Data

US 2003/0161521 A1 Aug. 28, 2003

(51) Int. Cl.[7] .................................................. G06K 9/00
(52) U.S. Cl. ....................... 382/131; 382/168; 128/922; 250/363.03; 378/4
(58) Field of Search ........................ 250/363.04, 363.01, 250/363.02, 363.03, 363.05; 382/100, 128, 131, 168–172; 128/922; 378/4, 21–27, 901; 424/9.4; 708/205; 702/180, 194; 330/284; 358/522

(56) References Cited

U.S. PATENT DOCUMENTS 6,410,919 B1 * 6/2002 Nickles ................. 250/363.03
6,429,434 B1 * 8/2002 Watson et al. .......... 250/363.04
6,468,218 B1 * 10/2002 Chen et al. .................. 600/443
6,490,476 B1 * 12/2002 Townsend et al. .......... 600/427

OTHER PUBLICATIONS

M. Defrise, et al., "Exact and Approximate Rebinning Algorithms for 3D PET Data," IEEE Transactions on Medical Imaging, vol. 16, No. 2, pp. 145–158, 1997.

M. Dahlbom, et al., "Implementation of True Continuous 2D/3D Whole Body PET Scanning," 2000 IEEE Medical Imaging Conference.

M. Dahlbom, et al., "Methods for Improving Image Quality in Whole Body PET Scanning," IEEE Transactions on Nuclear Science, vol. 39, No. 4, pp. 1079–1083, 1992.

* cited by examiner

*Primary Examiner*—Samir Ahmed
*Assistant Examiner*—Anand Bhatnagar
(74) *Attorney, Agent, or Firm*—Pitts & Brittian, P.C.

(57) ABSTRACT

Apparatus and methods for three dimensional image reconstruction from data acquired in a positron emission tomograph (PET). This invention uses a parallel/pipelined architecture for processing the acquired data as it is acquired from the scanner. The asynchronously acquired data is synchronously stepped through the stages performing histogramming, normalization, transmission/attenuation, Mu image reconstruction, attenuation correction, rebinning, image reconstruction, scatter correction, and image display.

26 Claims, 11 Drawing Sheets

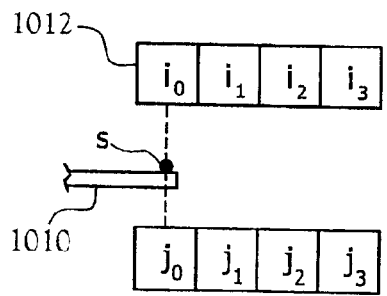
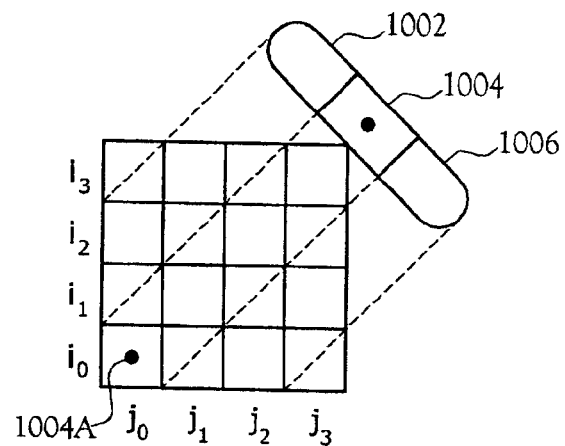
Fig.10A  Fig.10B
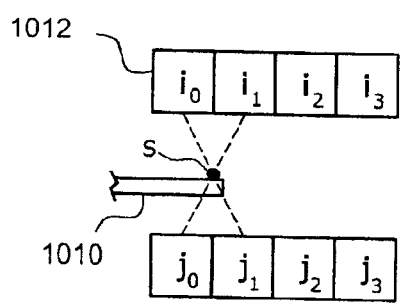
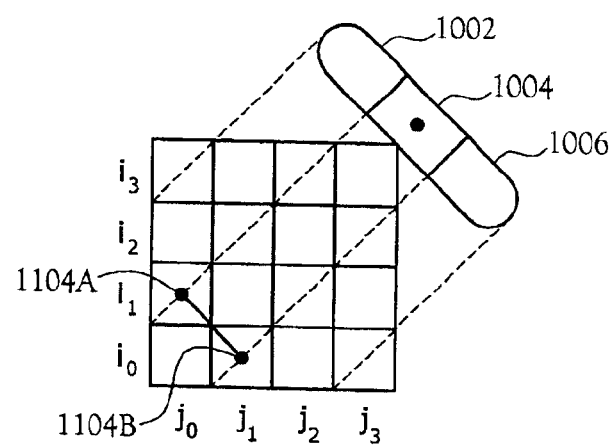
Fig.11A  Fig.11B

CONTINUOUS TOMOGRAPHY BED MOTION DATA PROCESSING APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to apparatus and processes for three-dimensional image reconstruction from data acquired in a positron emission tomograph (PET). More particularly, this invention pertains to apparatus and methods based on a parallel/pipelined architecture for processing data acquired as the bed moves through the tomograph.

2. Description of the Related Art

In a positron emission tomograph (PET) imaging system, a patient is injected with a radioactively tagged substance that the body normally metabolizes in some fashion. The radioactive tag used is a positron-emitting isotope of either an element found in the substance or an element that is substituted for another element in the substance. For example, a widely used isotope is the positron-emitting isotope of fluorine, $^{18}F$. This isotope is substituted, through a chemical synthesis process, for hydrogen in complex compounds such as glucose-forming fluro-deoxyglucose (FDG). When FDG is injected into a patient, the body will attempt to use it in the same fashion as it would normal glucose. Thus, there will be higher concentrations of positron emitters in areas where glucose is metabolized at higher levels, such as the brain, muscle tissue (the heart), and tumors.

As the FDG or other radiopharmaceutical isotopes decay in the body, they discharge positively charged particles called positrons. Upon discharge, the positrons encounter electrons, and both are annihilated. As a result of each annihilation event, gamma rays are generated in the form of a pair of diametrically opposed photons approximately 180 degrees (angular) apart. By detecting these annihilation "event pairs" for a period of time, the isotope distribution in a cross section of the body can be reconstructed. These events are mapped within the patient's body, thus allowing for the quantitative measurement of metabolic, biochemical, and functional activity in living tissue. More specifically, PET images (often in conjunction with an assumed physiologic model) are used to evaluate a variety of physiologic parameters such as glucose metabolic rate, cerebral blood flow, tissue viability, oxygen metabolism, and in vivo brain neuron activity.

Mechanically, a PET scanner consists of a bed or gurney and a gantry, which is typically mounted inside an enclosure with a tunnel through the center, through which the bed traverses. The patient, who has been treated with a radiopharmaceutical, lies on the bed, which is then inserted into the tunnel formed by the gantry. Traditionally, PET scanners are comprised of one or more fixed rings of detectors, surrounding the patient on all sides. Some newer scanners use a partial ring of detectors and the ring revolves around the tunnel. The gantry contains the detectors and a portion of the processing equipment. Signals from the gantry are fed into a computer system where the data is then processed to produce images.

Detectors on the detector rings encircling the patient detect the gamma rays, one on either side of the patient, and the time at which they were detected. Therefore, when two detectors on opposite sides of the patient have detected gamma rays that occurred within some time window of each other, it is safe to assume that the positron-electron interaction occurred somewhere along the line connecting the two detectors. If the detectors that detected the pair of gamma rays are located on the same ring, the coincidence plane, which is a transaxial plane, is called a direct plane. If the detectors are located on different rings, the coincidence plane, which is an oblique plane, is called a cross plane.

By histogramming the detected occurrences based on these lines of response (LOR), a pattern that uniquely describes the distribution of radioactivity is formed. The array in which the histogram is formed is typically called a sinogram. An image of the isotope distribution can be formed from these sinograms using any number of techniques that have been described in the prior art. However, the image that is produced is inaccurate due to several factors. As the gamma rays pass through the patient's body (and other objects, such as the patient bed), they are attenuated and scattered. Additionally, each gamma ray detector has a different response. All of these factors produce either noise or artifacts. Methods for correcting these effects are described in the prior art.

Positron emission tomography is one of the medical imaging modalities for which the transition from two-dimensional to three-dimensional acquisition has been most successful. Following pioneering work in the 1980s, the development after 1989 of multi-ring scanners equipped with retractable septa has led to the present widespread utilization of volume PET-scanners. These scanners have an open, collimator-less cylindrical geometry, which allows the measurement of coincidences between all pairs of detectors on the cylindrical surface.

Data collected in the transaxial or direct plane and in the oblique planes is three-dimensional (3D) data. These 3D data approximate line integrals of the radioactive tracer distribution along LORs which are not restricted to lie within transaxial planes. This is in contrast with the two-dimensional (2D) data acquired when the scanner is operated in 2D mode, in which the data collected is limited to LORs in the transaxial planes. The transition from 2D acquisition to 3D acquisition leads to a significant improvement of the scanner sensitivity, due to the increased number of measured LORs and to the elimination of the detector's shadowing by the septa.

Usually, 3D PET data are reconstructed using a reprojection algorithm (3DRP), which is a 3D filtered-backprojection (FBP) method obtained by discretizing an analytical reconstruction formula. Owing to the considerable number of LORs measured in 3D mode, it is not surprising that the 3DRP algorithm is much more time consuming than the 2D slice-by-slice FBP used to reconstruct data acquired in 2D mode. A further reason for this increased complexity is that the reconstruction of the 3D image is not decomposed into the reconstruction of a set of independent slices. Other algorithms relying on exact analytical formulae have so far been unable to reduce reconstruction time by factors larger than 2 compared to the 3DRP algorithm. In contrast, significant improvements in the reconstruction speed have been achieved using various combinations of the three following approaches. The first one is the introduction of faster, but often expensive, hardware. The second approach uses a reduced sampling of the 3D data to decrease the number of LORs which must be backprojected. Reduced sampling is achieved by adding groups of adjacent LORs in such a way that the resulting loss of spatial resolution remains acceptable for a given type of study. Finally, the third approach to faster 3D reconstruction is the use of approximate algorithms based on axial rebinning. The Fourier rebinning (FORE) process is one such approximate algorithm. The FORE algorithm is described in "Exact and Approximate Rebinning Algorithms for 3D PET data," M. Defrise, P. Kinahan, D. Townsend, C. Michel, M. Sibomana, and D. Newport, IEEE Transactions on Medical Imaging, pp. 145–58, 1997.

The advantages of using a continuous axial scanning motion are described in "Implementation of True Continuous Whole Body PET Scanning," M. Dahlbom, J. Reed, and J. Young, IEEE 2000 Medical Imaging Conference. This paper describes performing a scan by moving the patient bed in small, discrete steps. True continuous movement of the patient bed is described in "Methods for Improving Image Quality in Whole Body PET Scanning," M. Dahlbom, DC Yu, S. Cherry, A. Chatziioannou, and E. Hoffman, IEEE Transactions on Nucl. Sci., Vol. 39, No. 4, pp. 1079–83, 1992. This second paper describes scanning a continuously moving subject and storing the data in list mode, which is later sorted into sinograms for reconstruction.

BRIEF SUMMARY OF THE INVENTION

Apparatus and methods for processing continuous bed motion, three-dimensional (3D) positron emission tomography (PET) acquisitions based on a parallel/pipelined architecture are provided. As the patient bed crosses predetermined positions, specific portions of the acquired data are inserted into the processing pipeline. At each stage of the pipeline, a different processing step is performed on the data in parallel to the others. One of these stages is the conversion of the 3D data set to a two-dimensional (2D) data set. The final result of the pipeline is a single reconstructed image plane corresponding to the acquired data inserted in the pipeline at an earlier time. As the patient bed moves, new image planes are continually produced in a periodic fashion. At the completion of the acquisition, only the portions of the data not in the pipeline and those remaining in the pipeline have to be processed through the pipeline.

During acquisition, the emission and/or transmission events are received from an acquisition processor, along with information on the current position of the patient bed. These events are histogrammed into a 3D sinogram space based on the current patient bed position. When the patient bed has moved a predetermined amount, the histogramming is shifted based on this amount. With this shift, a portion of the 3D sinogram space is no longer within the histogramming region, which corresponds to the portion of the patient and patient bed that has traversed, and is no longer within, the axial field-of-view of the tomograph. This portion of the 3D sinogram space is transferred to either an attenuation processing process (for transmission data) or a normalization process (for emission data). When normalization has been completed, the normalized emission data is transferred to an attenuation correction process. After attenuation correction has been completed, the corrected data is transferred to the Fourier Rebinning (FORE) process. The FORE process is a conversion of the data from a 3D data set to a 2D data set.

Just as with the histogramming process, when the patient bed has moved a predetermined amount, the FORE processing is shifted a corresponding amount. With this shift, a portion of the 3D sinogram space is no longer within the FORE processing region. This region corresponds to the portion of the patient and patient bed that has traversed, and is no longer within, the axial field-of-view of the tomograph. This portion of the now 2D sinogram space is transferred to an image reconstruction process. After the reconstruction process is completed, the image plane is stored, scatter corrected, and/or displayed. All stages of this parallel/pipelined architecture are operating on data at the same time. However, the data for a given processing stage is different from the data in the other processing stages.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 10A and 10B illustrate the acquired data of a source for a first bed position in a four-ring scanner;

FIGS. 11A and 11B illustrate the acquired data of a source for a second bed position in a four-ring scanner;

DETAILED DESCRIPTION OF THE INVENTION

Apparatus and methods for processing continuous bed motion, three-dimensional (3D) positron emission tomography (PET) acquisitions based on a parallel/pipelined architecture are disclosed. A PET scanner has a bed that moves continuously as the patient is being scanned. The data from the scanner is processed as it is acquired, producing an image within a short time after the scanning is completed.

Figure 1:
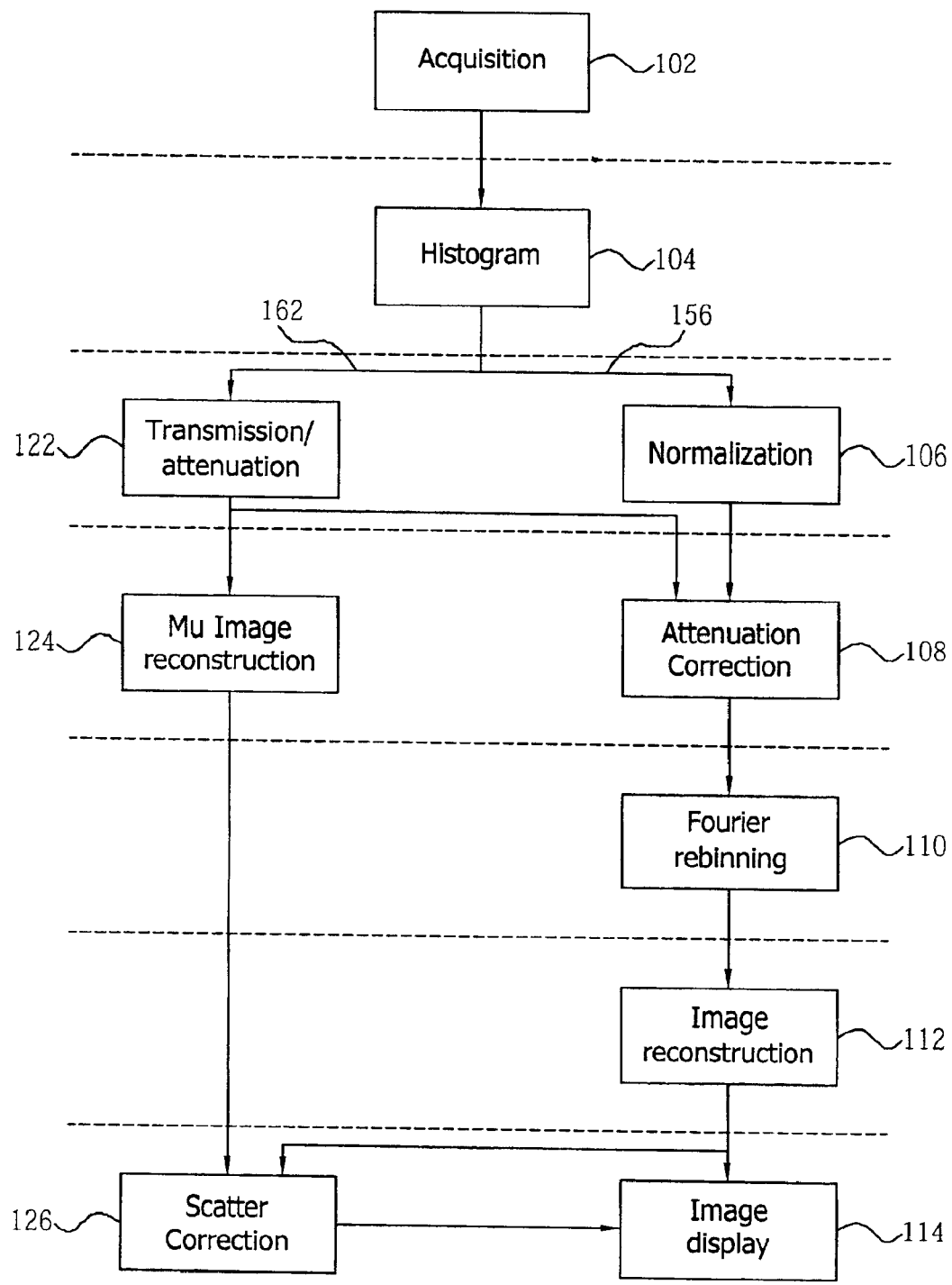
FIG. 1 is a block diagram of the parallel/pipelined architecture.

FIG. 1 is a block diagram that illustrates the parallel/pipelined architecture. Although the following discussion is in terms of a process, the present invention includes the hardware and software used to implement the various process steps. The means to implement the individual processes are known in the art, as are the means to control the data flow between the processes. In one embodiment, the enumerated processes are implemented by a multi-threaded software program running on at least one processor. In another embodiment, a combination of hardware and software is used to implement the enumerated processes.

In FIG. 1, the first block represents the acquisition 102 of the data from the scanners. The acquisition process 102 includes collecting the raw data from the scanner detectors and storing this data in a list mode data file. The data acquired includes emission and/or transmission events along with information on the current position of the patient bed. The acquisition process 102 collects data continuously as the patient, on the patient bed, moves through the scanner. The data from the acquisition process 102 is output, asynchronously, to the histogram process 104. The data stream to and from the acquisition process 102 is the only data stream that is asynchronous, all the other data streams to and from the other processes are synchronous, dependent upon equipment resources and the plane step time.

The histogram process 104 creates a 3D sinogram space histogram of the emission and/or transmission events received from the acquisition process 102, along with information on the current position of the patient bed. Those skilled in the art will recognize that the bed position information can be either a time signal based on a fixed bed speed or a position signal based on a bed position sensor. The emission events are histogrammed into a 3D sinogram space based on the current patient bed position. When the patient bed has moved a predetermined amount, the histogramming is shifted a corresponding amount. With this shift, a portion of the 3D sinogram space is no longer within the histogramming region, which corresponds to the portion of the patient and patient bed that has traversed, and is no longer within, the axial field-of-view of the tomograph.

The histogram process 104 outputs synchronous data as two data streams 162, 156. The first data stream 162 from the histogram process 104 transfers the contents of a transmission data file created during the histogram process 104 to a transmission/attenuation process 122. The transmission data file contains two-dimension (2D) data. The transmission/attenuation process 122 uses an existing blank transmission data file to create an attenuation data file. The transmission/attenuation process 122 outputs a data stream to both an attenuation correction process 108 and a Mu image reconstruction process 124. The Mu image reconstruction process 124 creates a Mu image data file and outputs a data stream to a scatter correction process 126.

The second data stream 156 transfers the contents of a 3D emission data file created during the histogram process 104. The second data stream 156 transfers the data to a normalization process 106. The normalization process 106 uses an existing normalization file to create a second emission data file. The existing normalization file contains the normalization coefficients. The normalization process 106 outputs a data stream to the attenuation correction process 108.

The attenuation correction process 108 accepts a data stream from the transmission/attenuation process 122 and the normalization process 106. The attenuation correction process 108 creates a sinogram data file and outputs a data stream to a Fourier rebinning (FORE) process 110, which creates an image data file and outputs a 2D data stream to an image reconstruction process 112 and the scatter correction process 126. The FORE process 110 converts the data from a 3D data set to a 2D data set.

The data passing through the FORE process 110 corresponds to the bed movement. After the patient bed has moved a predetermined amount, a portion of the 3D sinogram space is no longer within the FORE processing 110 region. This portion of the 3D sinogram space corresponds to the portion of the patient and patient bed that has traversed, and is no longer within, the axial field-of-view of the tomograph. The output of the FORE process 110, which represents a 2D sinogram space, is transferred to an image reconstruction process 112. After the reconstruction process 112 is completed, the image plane is stored, scatter corrected 126, and/or displayed 114.

The scatter correction process 126 accepts data streams from the image reconstruction process 112 and the Mu image reconstruction process 124. The scatter correction process 126 creates a final image data file and outputs a data stream to the image display process 114.

All stages of the above-described parallel/pipelined architecture are operating on data at the same time. However, the data for a given processing stage is different from the data in the other processing stages. Just as in any parallel/pipelined architecture, each stage of processing must complete processing the current data before accepting new data. Therefore, the data from one stage of processing cannot be sent to the next stage of processing until the next stage has completed processing data from the previous cycle. Thus, the overall speed of processing is determined by the slowest stage of processing. Those skilled in the art will recognize that processing stages can be omitted or additional processing stages (various corrections, such as arc correction, etc.) can be added to the architecture without departing from the spirit and scope of the present invention.

Figure 2:
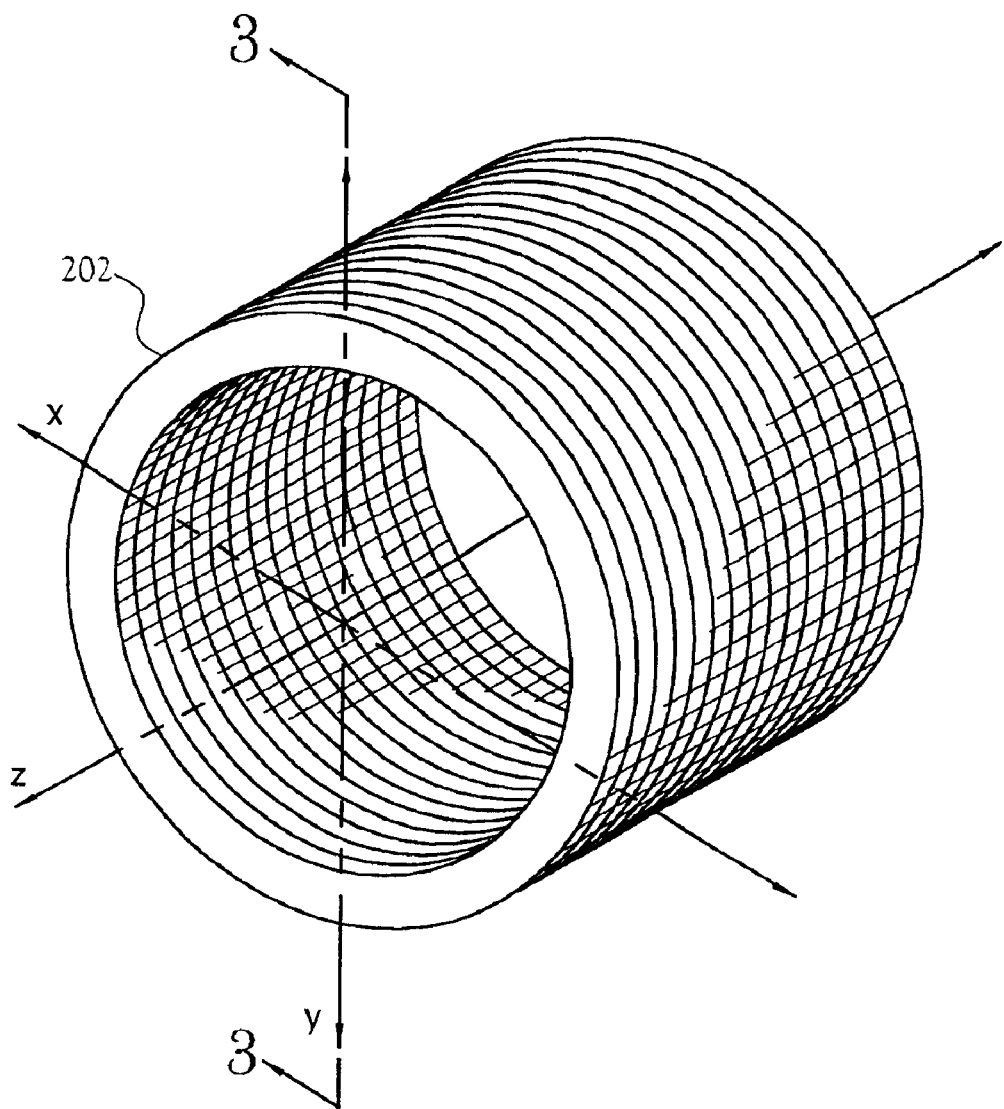
FIG. 2 is a perspective view of the detector rings of a scanner.
Figure 3:
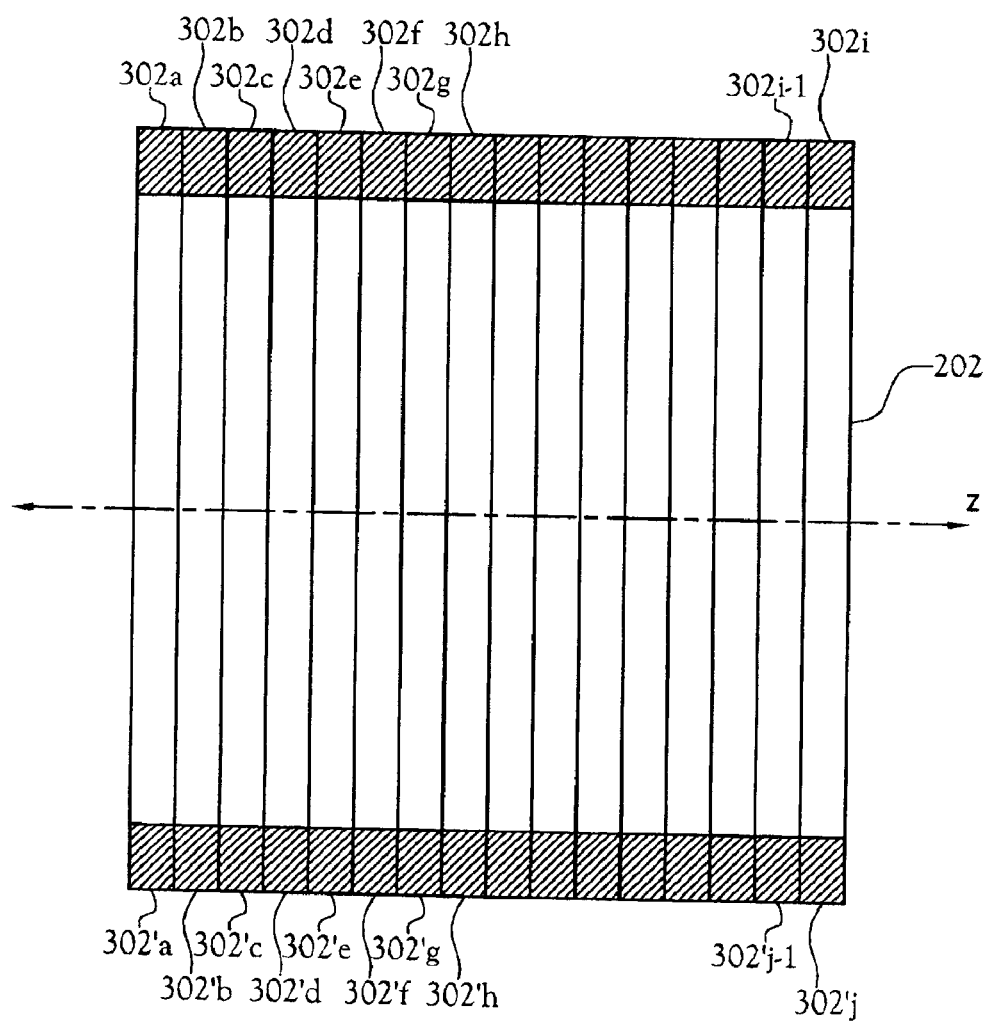
FIG. 3 is a section view of the detector rings of a scanner.

FIG. 2 illustrates a scanner 202 with 16 rings of detectors. FIG. 3 is a cross-sectional view of the detector rings 302 in a scanner 202. The indices j and i of FIG. 3 each represent one half of a pair of rings in coincidence.

Figure 4:
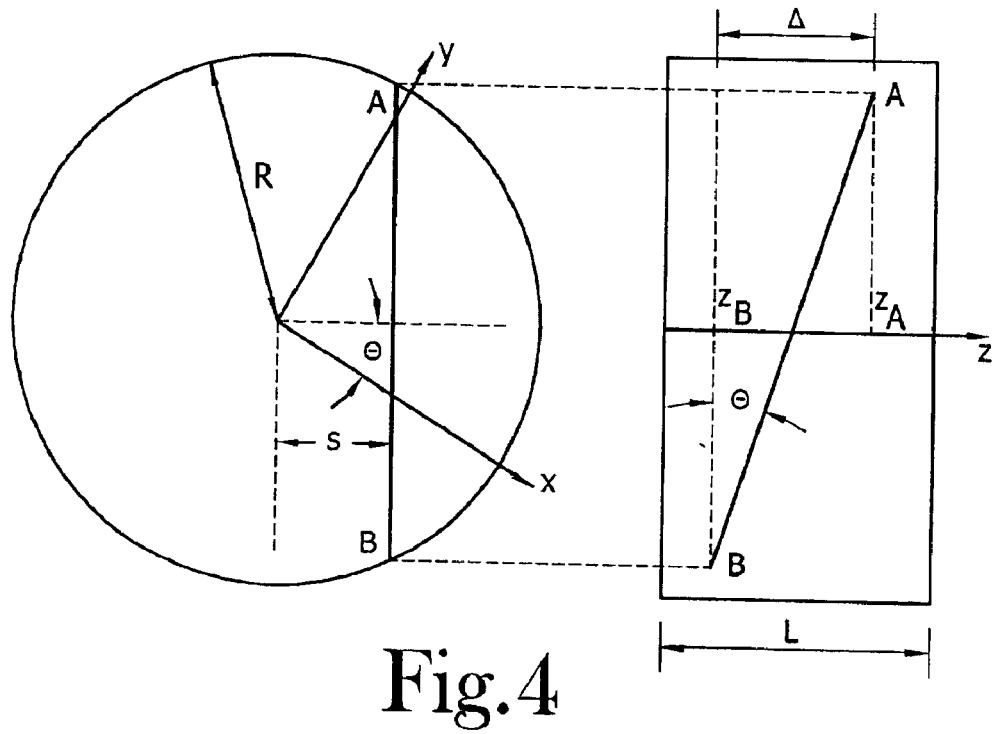
FIG. 4 shows the geometry of a cylindrical PET scanner.

FIG. 4 illustrates the geometry of a cylindrical PET scanner having a radius R and a length L. FIG. 4 includes a transaxial view (left side of figure) showing the x, y axes and the sinogram variables S and $\phi$, and it includes a longitudinal view (right side of figure) showing the z axis and the sinogram variables z and $\Delta$. The axes x, y are shown rotated for illustrative purposes. In FIG. 4, a line of response (LOR) is shown extending between two detectors A and B. The sinogram variable s is the distance between the z axis and the projection of the LOR onto a transaxial plane, and $\phi$ is the angle between this projection and the y axis, which, as illustrated in FIG. 4, is equal to the angle of a line perpendicular to the projection of the LOR and the x axis. The set of data corresponding to a fixed pair (s, $\phi$) define an ordinary, 2D sinogram.

The longitudinal view of FIG. 4 shows the sinogram variable $\Delta$ as the longitudinal distance between the two detectors A and B, or $z_A - z_B$, with $z_A$ being the location of one detector A along the z axis, measured from a point on the z axis, and $z_B$ being the location of the other detector B along the z axis, measured from the same point on the z axis. A fourth sinogram variable, z, not illustrated, is defined as $(z_A - z_B)/2$. Thus, z is the axial coordinate of the point mid-way between the two detectors, and $\Delta$ is the axial spacing between the two detectors A and B. The set of data corresponding to a fixed pair (z, $\Delta$) define an oblique sinogram, with the special case of $\Delta=0$ being called a direct sinogram. For a PET scanner with N rings, such as the 16 ring scanner illustrated in FIGS. 2 and 3, each pair of rings corresponds to a fixed pair (z, $\Delta$), and hence, the data acquired in 3D mode consists of $N^2$ sinograms, in which are included N direct sinograms and $N \cdot (N-1)$ oblique sinograms. The four sinogram parameters (s, $\phi$, z, $\Delta$) define a 3D sinogram. A 2D sinogram is restricted to LORs in the transaxial plane, so that $z_A=z_B$. Therefore, a 2D sinogram is defined by three parameters (s, φ, z). Reconstructing slices, or direct sinograms, from 2D data involves less parameters than reconstructing slices from 3D data. A rebinning algorithm is a method to estimate 2D slices from 3D data.

Figure 5:
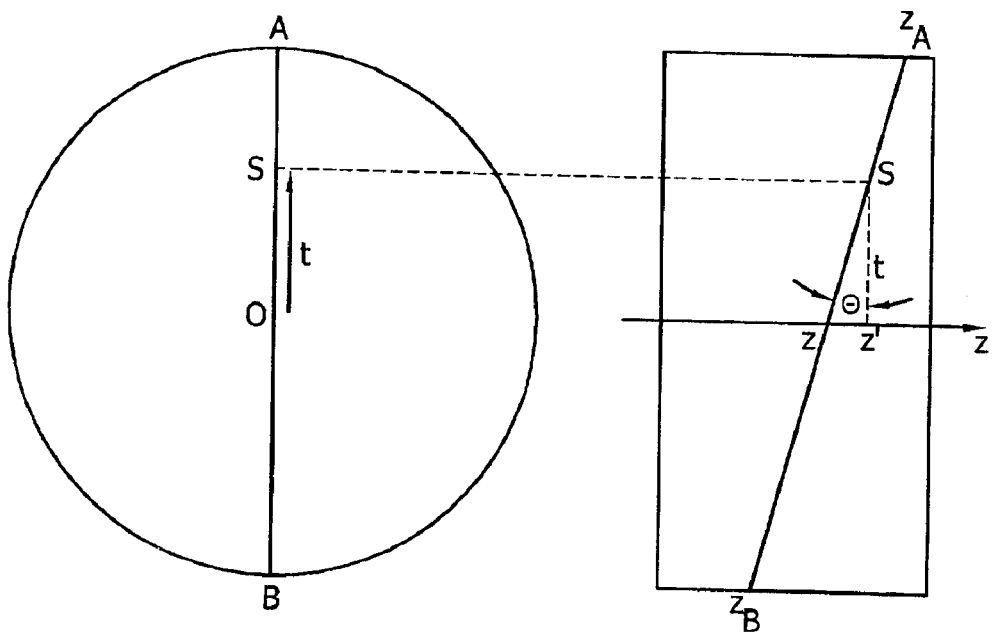
FIG. 5 shows the geometrical interpretation of Fourier rebinning.

FIG. 5 illustrates the geometry of a cylindrical PET scanner with a source S at a distance t from the axis z. The axial position of the source S can be determined from the equation $z'=z+t\cdot\tan(\theta)=z+\delta\cdot t$, where z is the axial point midway between the detectors A and B and where δ is the tangent of the angle θ between the LOR and the transaxial plane, called the ring difference. Although the distance t cannot be associated with an LOR, the 2D Fourier transform of the sinogram gives a frequency-distance relationship, which permits estimating the distance t. This relationship leads to the Fourier rebinning (FORE) algorithm. The FORE algorithm requires the 3D data to be organized as a set of oblique sinograms, each of which is characterized by a pair (z, δ). The algorithm processes each sinogram independently of the others, and its implementation is therefore independent of the way in which the variables z and δ are sampled.

Figure 6:
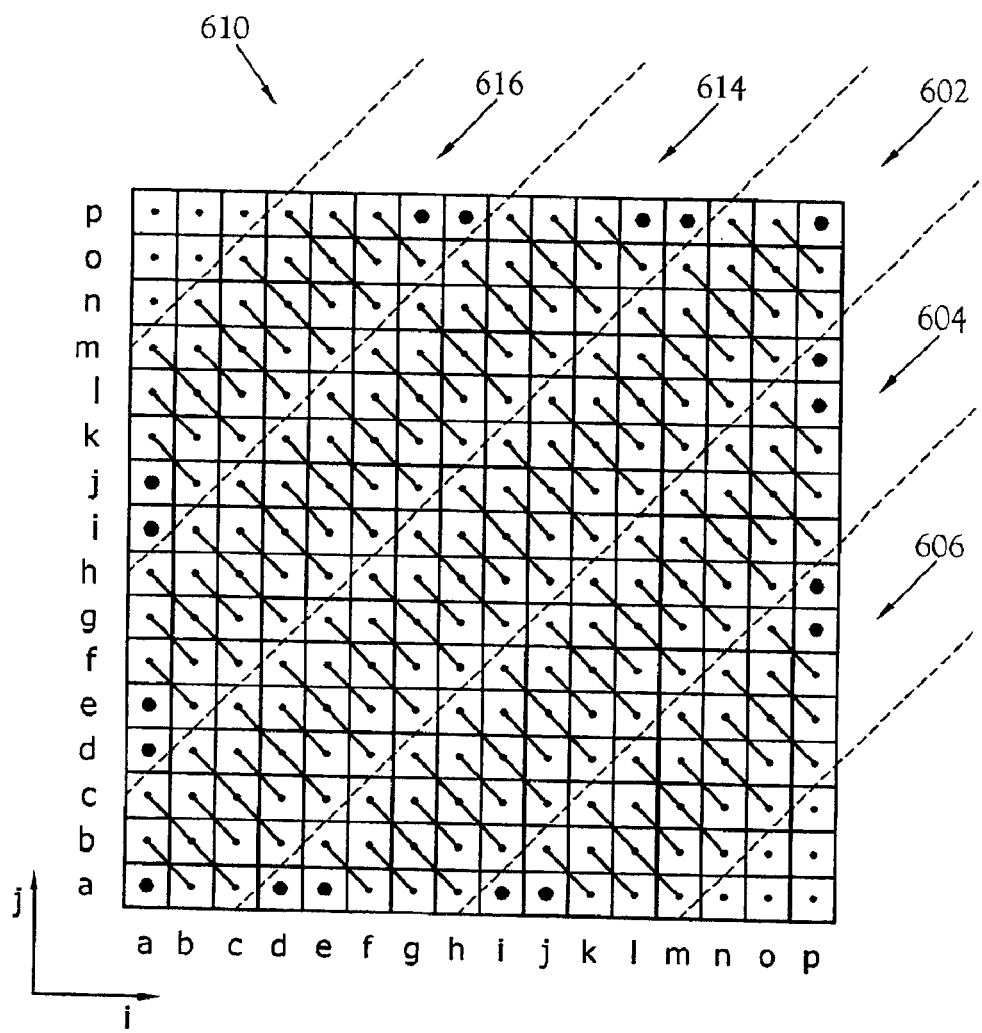
FIG. 6 is a Michelogram of the three-dimensional data acquired with a N=16 ring scanner.

FIG. 6 illustrates a Michelogram 610, which is a graphical representation of the planes of response which get grouped together to reduce data set size in three-dimensional PET. The Michelogram 610 illustrates the 3D data set acquired with a N=16 ring scanner, as illustrated in FIGS. 2 and 3. The vertical j and horizontal i axes correspond respectively to the indices j and i of two rings in coincidence. The indices j, i are illustrated in FIG. 3. Each square in FIG. 6 corresponds to one oblique sinogram (i, j), which can be characterized by the pair (z, δ). The oblique sinograms are defined by the sampling scheme of the following equations:

$$\delta=d\cdot\Delta\cdot\delta \text{ where } d=(i-j)=0, \pm 1, \pm 2, \ldots, \pm d_{max}$$

$$z=-(L-\sigma)/2+n\cdot\sigma/2 \text{ where } n=(i+j)=|d|, |d|+2, |d|+4, \ldots, 2N-2-|d|$$

where N=number of rings and the ring indices j, i run between 0 and N−1, σ=L/N, Δ·δ=σ/2R is the axial angular sampling and −(L−σ)/2 is the axial coordinate of the center of the first ring. The parameter $d_{max}$ determines the maximum value of δ in the acquired data.

To gain both memory and reconstruction speed, 3D data is acquired with a reduced axial sampling as shown with the sampling scheme of the following equations:

$$\delta=\underline{d}\cdot\Delta\cdot\delta \text{ where } \underline{d}=0, \pm S, \pm 2S, \pm 3S, \ldots, \pm d'_{max}$$

$$z=-(L-\sigma)/2+n\cdot\sigma/2 \text{ where } n=n_0, n_0+1, n_0+2, \ldots, 2N-2-n_0$$

where S is an integer parameter called 'span,' and $n_0=\max\{0, |\underline{d}|-(S-1)/2\}$. Each discrete sample ($\underline{d}$, n) is obtained by summing the range of LORs about $\underline{d}$ defined by $|d-\underline{d}|\leq(S-1)/2$ where d is as defined above. The number of LORs summed in this manner is approximately S/2.

The reduced axial sampling scheme is illustrated in FIG. 6, in which the sets of oblique sinograms linked by the diagonally oriented line segments are added together. The example shown is for a span S=5 and $d_{max}=12$. The central area 602 between the dashed lines represents where $\underline{d}=0$. Flanking that area is one area 604 that represents $\underline{d}=5$ and the another area 614 that represents $\underline{d}=-5$. Extending outward from the center area 602, the next area 606 represents $\underline{d}=10$ and the other area 616 represents $\underline{d}=-10$.

Figure 7:
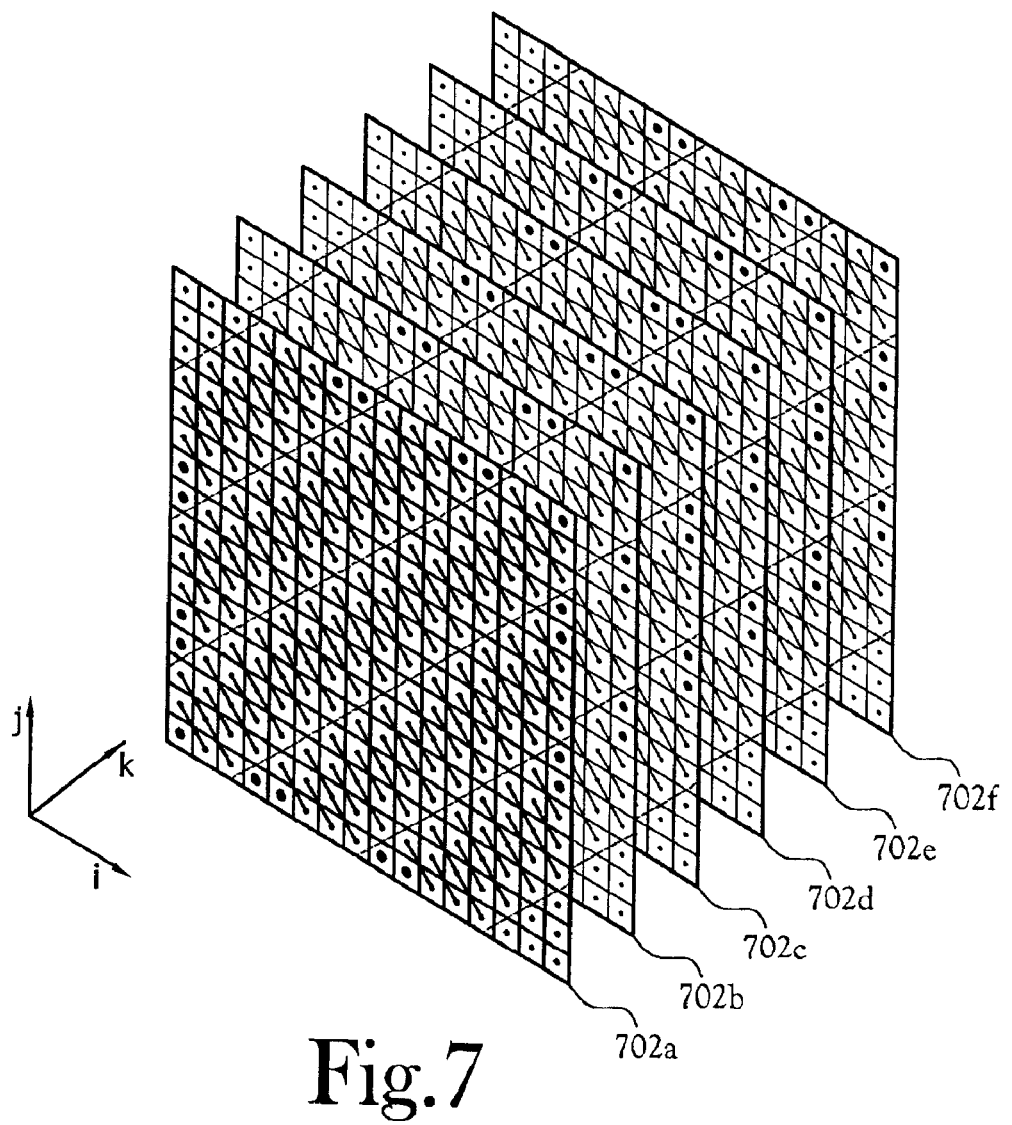
FIG. 7 is a series of Michelograms representing a series of bed positions.

FIG. 7 is a 3D schematic of multiple groupings of 3D data as shown in FIG. 6. As the patient bed traverses the scanner, a multitude of sinograms 702 are acquired. The data set 610 illustrated in FIG. 6 represents the sinograms acquired and processed after the patient has traveled a specified distance, typically one-half the detector width. After the patient bed has traversed this distance, represented by the k axis in FIG. 7, another set of sinograms is acquired and processed. The parallel planes representing the data sets of sinograms illustrate the data sets 702 generated during a PET scan with continuous bed motion. As the bed traverses the scanner, one data set 702 after another is acquired. Each of these data sets are processed independently and sequentially as illustrated in FIG. 1.

For example, the acquisition process 102 continuously acquires raw data and outputs data to the histogram process 104. When the histogram process 104 has processed a data set 702a, it outputs that data set 702a to the transmission/attenuation process 122 and/or the normalization process 106, which processes the data and then outputs the data set 702a to the next processing stage. Once the histogram process 104 outputs the data set 702a, the histogram process 104 prepares to output the next data set 702b, which can be output only when the transmission/attenuation process 122 and/or the normalization process 106 has completed its processing of the data set 702a and has completed the transfer of the data set 702a to the next stage. The data sets 702 flow through the parallel/pipelined architecture in this stepwise manner until all the data sets 702 acquired have been processed.

Figure 8:
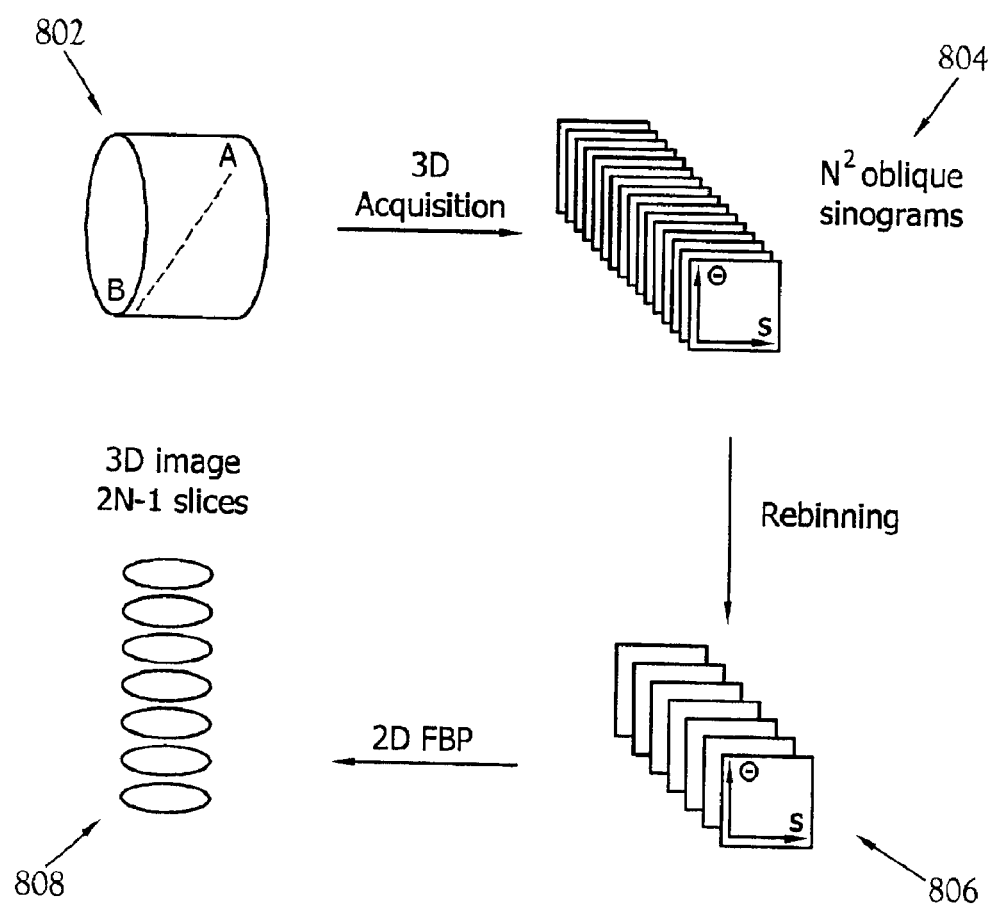
FIG. 8 is a pictorial illustration of the principle of a rebinning algorithm.

FIG. 8 illustrates the principle of a rebinning algorithm and shows the basic steps in processing the data to produce a 3D image. Three-dimensional data 801 is acquired from the scanner and processed into $N^2$ oblique sinograms 804, where N represents the number of direct slices or sinograms for the scanned image. The oblique sinograms are rebinned into 2N−1 ordinary sinograms 806, which represent slices separated by one-half the axial distance between adjacent detector rings. The rebinned data 806 is converted to 2N−1 slices for the 3D image 808 by using a 2D FBP algorithm.

Figure 9A:
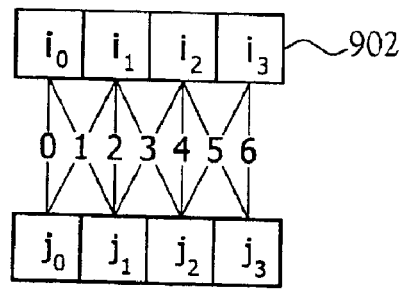
FIGS. 9A to 9D illustrate the representative lines of response for a four-ring scanner.
Figure 9B:
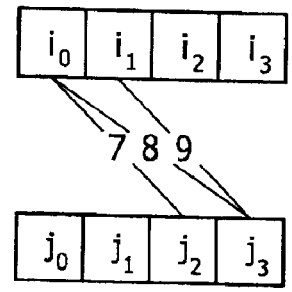
Figure 9C:
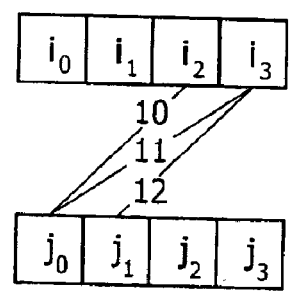
Figure 9D:
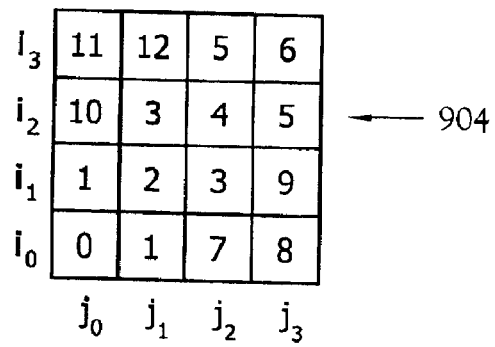

FIGS. 9A through 9C illustrate the coincidence planes for a four-ring scanner 902. FIG. 9D illustrates the placement of those coincidence planes on a Michelogram 904, which is a graphical representation of the planes of response which get grouped together to reduce the data set size in 3D PET. FIG. 9A shows the direct coincidence planes 0, 2, 4, 6 and the pair of oblique coincidence planes 1, 3, 5. FIG. 9B shows the oblique coincidence planes 7, 8, 9 and FIG. 9C shows the corresponding oblique coincidence planes 10, 11, 12. Referring to the Michelogram 904 of FIG. 9D, the coincidence planes 0 through 12 are indicated by the numbers in the cell corresponding to the coordinates of the rings i, j illustrated in FIGS. 9A through 9C.

As can be seen in FIGS. 9B and 9C, coincidence planes 8 and 11 define the maximum angle from the direct planes that an oblique plane will have for the number of rings in the scanner 902. This angle is called the acceptance angle. FIG. 6 illustrates a Michelogram 610 for a 16-ring scanner 202 in which $d_{max}=12$; that is, events detected by ring pairs more than 12 apart are not recorded. Accordingly, the acceptance angle used in FIG. 6 is less than the maximum defined by the detector rings at opposite ends of the scanner 202. The simplified example illustrated in FIGS. 9A through 9D does not illustrate reduced axial sampling as does the example illustrated in FIGS. 3 and 6.

The oblique coincidence planes 1, 3, 5 are cross planes and the events recorded in these planes are attributed to the space midway between the direct planes 0, 2, 4, 6. Because the cross planes 1, 3, 5 are defined by detectors in adjacent rings, the recorded events are summed. The oblique coincidence planes 7, 9, 10, 12 are second-order cross planes with a plane separation of ±2, and the events recorded in these planes approximately coincide with data recorded by the direct planes 0, 2, 4, 6. The oblique coincidence planes 8, 11 are third-order cross planes with a plane separation of ±3, and the events recorded in these planes approximately coincide with data recorded by the cross plane 3.

The counting efficiency of the cross planes 1, 3, 5, 7–12 is approximately twice that of the direct planes 0, 2, 4, 6 because the cross planes 1, 3, 5, 7–12 acquire data from twice as many detector pairs. To reorient the data acquired from the cross planes 1, 3, 5, 7–12 into axial cross sections, the difference in counting efficiency must be corrected, which is done during the normalization process 106.

FIGS. 10 through 14 provide a simplified illustration of the events recorded from a source S as it traverses a four-ring scanner 1012. In FIG. 10A, a scanner bed 1010 with a source S is positioned to traverse a four-ring scanner 1012, which is shown in section. The scanner bed 1010 is shown with a source S at the midpoint of the first detector ring $i_0$, $j_0$. The only coincidence plane that can be detected at this point is illustrated as a dotted line extending from the upper portion of the first ring $i_0$, through S, and to the lower portion of the first ring $j_0$. FIG. 10B illustrates a Michelogram showing a representation of the events recorded for the position of the source S. Diagonal to the Michelogram is a representation of the data set 1002, 1004, 1006 that is sent to the histogramming process 104 after all the data is acquired, which occurs when the source S exits the scanner 1012, as illustrated in FIG. 14A. The acquisition data, or sinogram, 1004 is represented by the dot in the cell at the intersection of $i_0$ and $j_0$ and contains the acquisition data for the source S acquired by the detectors on the first ring $i_0$, $j_0$. This first acquired sinogram data 1004A is stored in the data set storage point 1004.

FIG. 11A illustrates the source S after it has moved to the midpoint between the rings $i_0$, $j_0$ and $i_1$, $j_1$. At this point, two coincidence planes are detected. In FIG. 11B, the acquisition data for each coincidence plane is represented by the dots 1104A, 1104B in the Michelogram. The two dots 1104A, 1104B are connected by a solid line that indicates that the data from each coincidence plane is summed. The summed data 1104A, 1104B is added to the data stored in the data set storage point 1004, which at this time includes only the sinogram data 1004A.

Figure 12A:
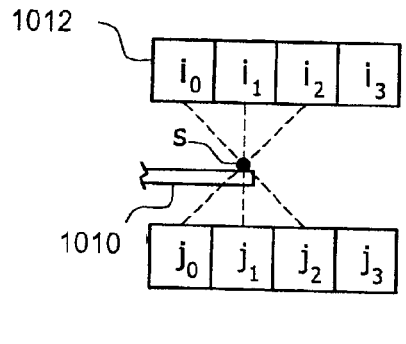
FIGS. 12A and 12B illustrate the acquired data of a source for a third bed position in a four-ring scanner.
Figure 12B:
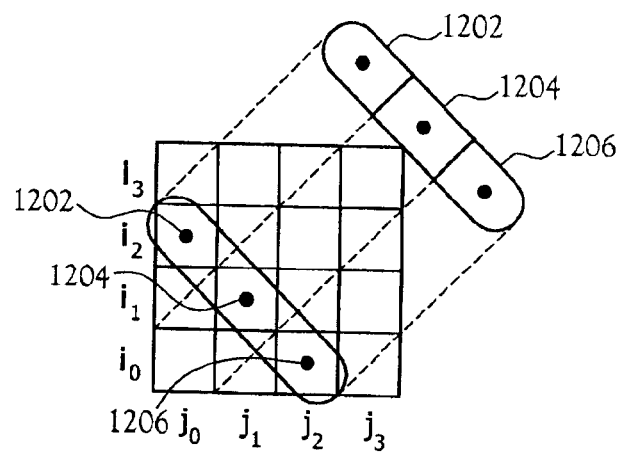

FIG. 12A illustrates the source S after it has moved to the midpoint of the second detector ring $i_1$, $j_1$. In FIG. 12B, the three coincidence planes are represented by the three dots 1202A, 1204A, 1206A in the Michelogram. The acquired data 1202A, 1206A is stored in the data set storage points 1002, 1006, respectively, and the data 1204A for the vertical, or direct, coincidence plane is added to the contents of the data set storage point 1004.

Figure 13A:
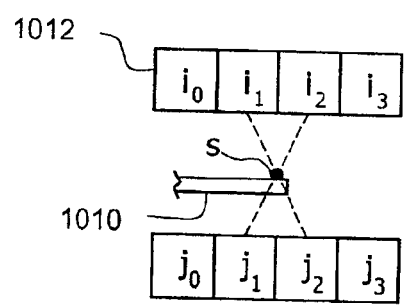
FIGS. 13A and 13B illustrate the acquired data of a source for a forth bed position in a four-ring scanner.
Figure 13B:
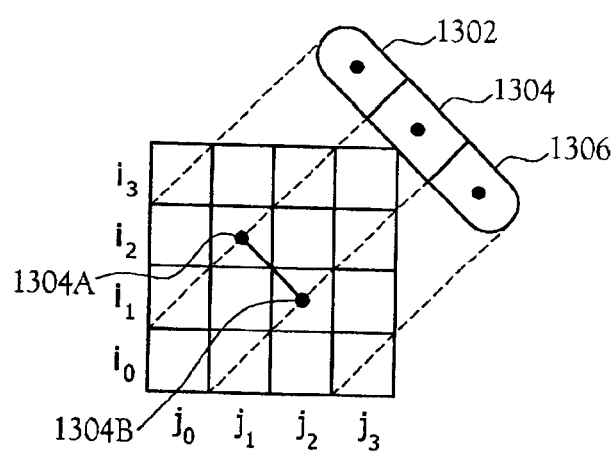

FIG. 13A illustrates the source S after it has moved to the midpoint between the rings $i_1$, $j_1$ and $i_2$, $j_2$. In FIG. 13B, two coincidence planes are represented by the two dots 1304A, 1304B in the Michelogram. The two dots 1304A, 1304B are connected by a solid line that indicates that the data from each coincidence plane is summed and added to the contents of the data set storage point 1004.

Figure 14A:
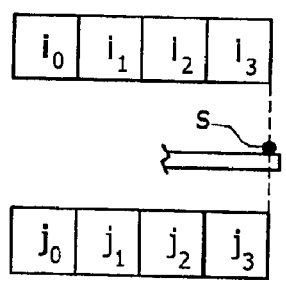
FIGS. 14A and 14B illustrate the acquired data of a source for a final bed position in a four-ring scanner.
Figure 14B:
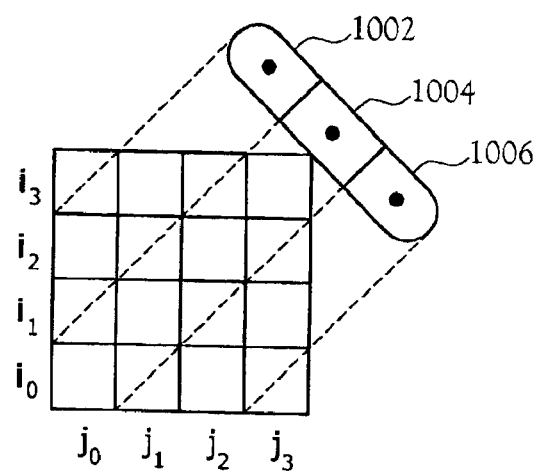

FIG. 14A illustrates the source S after it has passed through the scanner 1012. The source S positions between those illustrated in FIG. 13A and FIG. 14A are not illustrated. At the point illustrated in FIG. 14A, no more events can be recorded and the data set 1002, 1004, 1006 is transferred to the histogram process 104. After the data set is transferred, the data set storage locations 1002, 1004, 1006 are cleared and become available for storing another data set.

The example illustrated in FIGS. 10A through 14A traces a single point source S as it traverses a 4-ring scanner 1012. FIGS. 2 and 3 illustrate a 16-ring scanner 202, which has a more complex Michelogram 610. Those skilled in the art will recognize that the number of rings in a scanner can vary without departing from the spirit and scope of the present invention.

From the foregoing description, it will be recognized by those skilled in the art that apparatus and methods for real-time three dimensional image reconstruction from data acquired in a positron emission tomograph (PET) has been provided. As the tomograph bed moves continuously through the scanner, the acquired data flows through a processing system with a parallel/pipelined architecture.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for three dimensional image reconstruction from data acquired in a positron emission tomograph, said apparatus comprising:

an acquisition processor in communication with a PET scanner, said acquisition processor for receiving a plurality of event information and a plurality of bed position information;

a histogram processor in communication with said acquisition processor, said histogram processor for creating a histogram;

a transmission and attenuation processor in communication with said histogram processor, said transmission and attenuation processor for receiving said histogram;

a normalization processor in communication with said histogram processor, said normalization processor for normalizing a plurality of emission event information contained in said histogram;

a Mu image processor in communication with said transmission and attenuation processor, said Mu image processor for reconstructing a transmission data image;

an attenuation correction processor in communication with said transmission and attenuation processor and with said normalization processor;

a rebinning processor in communication with said attenuation correction processor, said rebinning processor for converting a 3D file into a 2D file;

an image reconstruction processor in communication with said rebinning processor;

a scatter correction processor in communication with said Mu image processor and with an image display processor; and said image display processor in communication with said image reconstruction processor and with said scatter correction processor, said image display processor for producing an image file.

2. The apparatus of claim 1 wherein said acquisition processor accepts asynchronous data from said PET scanner.

3. The apparatus of claim 1 wherein said histogram processor accepts asynchronous data from said acquisition processor.

4. The apparatus of claim 1 wherein said transmission and attenuation processor is in synchronous communication with said histogram processor.

5. The apparatus of claim 1 wherein said normalization processor is in synchronous communication with said histogram processor.

6. The apparatus of claim 1 wherein said mu image processor is in synchronous communication with said transmission and attenuation processor.

7. The apparatus of claim 1 wherein said attenuation correction processor is in synchronous communication with said transmission and attenuation processor and with said normalization processor.

8. The apparatus of claim 1 wherein said rebinning processor is in synchronous communication with said attenuation correction processor.

9. The apparatus of claim 1 wherein said image reconstruction processor is in synchronous communication with said rebinning processor.

10. The apparatus of claim 1 wherein said scatter correction processor is in synchronous communication with said mu image processor and with said image display processor.

11. The apparatus of claim 1 wherein said image display processor is in synchronous communication with said image reconstruction processor and with scatter correction processor.

12. The apparatus of claim 1 wherein said rebinning processor implements a Fourier rebinning algorithm.

13. An apparatus for three dimensional image reconstruction from data acquired in a positron emission tomograph, said apparatus comprising:
   an acquisition processor in asynchronous communication with a PET scanner, said acquisition processor for receiving a plurality of event information and a plurality of bed position information;
   a histogram processor in asynchronous communication with said acquisition processor, said histogram processor for creating a histogram;
   a transmission and attenuation processor in synchronous communication with said histogram processor, said transmission and attenuation processor for receiving said histogram, said histogram corresponding to a plurality of transmission events;
   a normalization processor in synchronous communication with said histogram processor, said normalization processor for normalizing said histogram, said histogram corresponding to a plurality of emission events;
   a Mu image processor in synchronous communication with said transmission and attenuation processor, said Mu image processor for reconstructing a transmission data image;
   an attenuation correction processor in synchronous communication with said transmission and attenuation processor and with said normalization processor;
   a rebinning processor in synchronous communication with said attenuation correction processor, said rebinning processor for converting a 3D file into a 2D file;
   an image reconstruction processor in synchronous communication with said rebinning processor;
   a scatter correction processor in synchronous communication with said Mu image processor and with an image display processor; and
   said image display processor in synchronous communication with said image reconstruction processor and with said scatter correction processor, said image display processor for producing an image file.

14. The apparatus of claim 13 wherein said rebinning processor implements a Fourier rebinning algorithm.

15. An apparatus for three dimensional image reconstruction from data acquired in a positron emission tomograph, said apparatus comprising:
   a means for acquisition processing and producing a set of acquired data;
   a means for histogram processing said set of acquired data;
   a means for transmission and attenuation processing;
   a means for normalization processing;
   a means for Mu image processing;
   a means for attenuation correction processing;
   a means for rebinning processing;
   a means for image reconstruction processing;
   a means for scatter correction processing; and
   a means for image display processing.

16. The apparatus of claim 15 wherein said means for histogram processing produces a set of histogram data.

17. The apparatus of claim 15 wherein said means for transmission and attenuation processing produces a set of transmission-attenuation data.

18. The apparatus of claim 15 wherein said means for normalization processing produces a set of normalized data.

19. The apparatus of claim 15 wherein said means for mu image processing produces a set of mu image data.

20. The apparatus of claim 15 wherein said means for attenuation correction processing produces a set of attenuation correction data.

21. The apparatus of claim 15 wherein said means for rebinning processing produces a set of rebinning data.

22. The apparatus of claim 15 wherein said means for image reconstruction processing produces a set of image reconstruction data.

23. The apparatus of claim 15 wherein said means for scatter correction processing produces a set of scatter correction data.

24. The apparatus of claim 15 wherein said means for image display processing produces a set of image display data.

25. A method for three dimensional image reconstruction from data acquired in a positron emission tomograph while the tomograph bed moves continuously, said method comprising the steps of:
   a) acquiring data from a PET scanner and producing a set of acquired data;
   b) histogramming said acquired data and producing a set of histogram data;
   c) transmission and attenuation processing said set of histogram data and producing a set of transmission-attenuation data;
   d) normalizing said set of histogram data and producing a set of normalized data;
   e) reconstructing a mu image from said set of transmission-attenuation data and producing a set of mu image data;
   f) attenuation correcting said set of transmission-attenuation data and said set of normalized data, said step of attenuation correction producing a set of attenuation data;
   g) rebinning said set of attenuation data and producing a set of rebinned data h) reconstructing an image from said set of rebinned data and producing a set of reconstructed image data;

i) scatter correcting said set of reconstructed image data and set of reconstructed image data, said step of scatter correcting producing a set of scatter corrected data;

j) creating an image file from said set of reconstructed image data and said set of scatter corrected data.

26. The method of claim 25 wherein said steps of b) histogramming, d) normalizing, f) attenuation correcting, g) rebinning, h) reconstructing, i) scatter correction, and j) creating an image file operate on a data set sequentially, with each step producing said data set before receiving a next data set.

* * * * *